United States Patent Office 3,420,850
Patented Jan. 7, 1969

3,420,850
PROCESS FOR THE PRODUCTION OF 3,4-EPOXY-TETRAMETHYLENE-SULFONE
Walter Dittmann and Heinz Stork, Marl, Germany, assignors to Chemische Werke Huls Aktiengesellschaft, Marl, Germany, a corporation of Germany
No Drawing. Filed July 19, 1965, Ser. No. 473,233
Claims priority, application Germany, Nov. 12, 1964, C 34,343
U.S. Cl. 260—332.1        4 Claims
Int. Cl. C07d 63/18; C08f 45/58

ABSTRACT OF THE DISCLOSURE 3,4-epoxysulfolane in excellent yield is produced by reacting (heating) 3-sulfolene with hydrogen peroxide in the presence of a catalytic compound of tungsten. The peroxide is used in aqueous solution. The heating is carried out for several hours at a temperature in the range 30–90° C. The product is a stabilizer for halogen-containing polymers; also, is useful as an auxiliary material in textile manufacture, and as a monomer starting material in the production of polyethers, polyesters and the like.

---

It is known to produce 3,4-epoxy-tetramethylene-sulfone (3,4-epoxysulfolan) by epoxidizing 3-sulpholenes with performic acid at room temperature. The yield is only about 30% of the theoretical yield. The 3,4-epoxy-tetramethylene sulfone so produced is very stable and can be recovered unchanged after boiling for 3 hours in 98% formic acid. However due to the low yield, the use of a large amount of formic acid and the relatively complex procedure involved in this process it is uneconomical and not suitable for technical use.

It has also been proposed to make 3,4-epoxy-sulfolan by reacting 3-sulpholenes with peracetic acid.

It appears from a publication by M. Prochazka and V. Horak entitled "Uber Sulfolane II. Hydroxysulfolane" in Coll. Czech. Chem. Commun., vol. 24, page 1509 (1959) (see also C. page 5806 (1960)) that experiments for the production of trans-3,4-dihydroxy-sulfolan by the hydroxylation of 3-sulpholenes with hydrogen peroxide using chromic, tungstic and vanadic acids as catalysts were unsuccessful and that after long periods of treatment the unreacted 3-sulpholenes was recovered and no reaction had occurred. From this it was not to be expected that butadiene sulfone could be epoxidized by means of $H_2O_2$ in the presence of tungstic acid or a tungstate.

It has now been found that 3,4-epoxysulfolan can be produced with a yield of more than 80% by the reaction of 3-sulpholenes with hydrogen peroxide in the presence of catalytic amounts of tungstic acid or tungstates.

To carry out the reaction the 3-sulpholenes, the catalyst and the hydrogen peroxide are mixed and the mixture heated to the desired temperature. In large batches it becomes apparent that the reaction is exothermic. In such instances, when necessary, the desired temperature is maintained by cooling as required. It is however also possible to introduce only a part of the hydrogen peroxide or the catalyst at the beginning and to introduce the remainder continuously or portion-wise during the reaction. In order to separate and recover the reaction product the reaction mixture solution is cooled suitably to 0° C. and the resulting crystals separated by filtration. In order to operate with a solution of the reactants of the highest concentration and thus to facilitate the recovery of the highest possible yield of product generally no solvent is used and a high concentration of hydrogen peroxide, about 60% is used. It is however possible to carry out the process with a lower concentration of hydrogen peroxide, e.g., 30% or with water or water miscible organic solvents such as dioxan or tert butanol. These variations depend upon the size of the reaction mixture and upon other technical factors and must be determined in each instance. Finally it is possible to carry out the reaction continuously, e.g., in a cascade apparatus.

The molecular ratio of the hydrogen peroxide to the 3-sulpholenes should be at least 1 to 1. The preferred ratio is within the range from 1:1 to 2:1. In order to minimize the loss of $H_2O_2$ through decomposition a small amount of a complex former such as nitriloacetic acid, ethylenediamine acetic acid or their salts may be added.

The catalyst, tungstic acid or a tungstate such as sodium tungstate is used in an amount of from 0.1 to 5% by weight and preferably from 0.5 to 2.5 by weight based on the weight of the 3-sulpholenes. If tungstic acid is chosen as the catalyst the reaction may be carried out in the temperature range from 30 to 70° C. and requires, according to the temperature used, a reaction time of from about 5 to about 100 hours. In the temperature range from 50 to 60° C. the reaction is completed in from 8 to 15 hours. Above 70° C. practically no epxoide is recovered since side and other reactions occur. The reaction temperature of 70° C. must therefore be regarded as critical in the production of 3,4-epoxy-sulfolan by the present process.

If a neutral tungstate such as sodium tungstate is chosen as the catalyst the reaction proceeds only very slowly below 50° C. In the range from 50 to 90° C. the reaction proceeds to the production of a good yield within the range from 2 to 40 hours. The preferred temperature range when sodium tungstate is used as the catalyst is from 60 to 80° C. with a reaction time of from 4 to 25 hours.

The crude 3,4-epoxysulfolan recovered by filtering and drying is colorless and nearly pure. It has a melting point between 146° C. and 159° C. (theory: 159–160° C.) and an epoxide oxygen content of 10.8 to 11.9% (theory: 11.9%). It can be recrystallized from water or organic solvents such as ethanol, ethyl acetate, acetone, dioxan and/or toluene but for many purposes it may be used as the crude product.

The product, 3,4-epoxy-tetramethylene sulfone, is useful as a stabilizer for halogen containing polymers such as polyvinyl chloride, mixed polymers containing polyvinyl chloride and polymers which have been rendered flame resistant by halogen containing additions. It can be used also as a reactive addition to epoxy resins and other resins or as a monomer starting material in the production of polymers such as polyethers and polyesters. It may also be used as an auxiliary material in textile manufacture.

The invention is further described and illustrated by the following specific examples.

EXAMPLES 1 TO 11

3-sulpholenes, hydrogen peroxide and catalyst were heated together with stirring to the reaction temperature. After the end of the reaction the mixture was cooled to 0–5° C. and the 3,4-epoxy-sulfolan separated by filtration and dried. The amounts of the reagents, the reaction time and temperature, the yield and the melting point and epoxy-oxygen content of the product are given in the following table.

| Example | 3-sulpholenes | | Tungstic acid, g. | Na₂WO₄·2H₂O, g. | H₂O₂ 58.6% | | Reaction | | Yield | | Melting point, °C. | Epoxide-oxygen, percent |
|---|---|---|---|---|---|---|---|---|---|---|---|---|
| | G. | Mol | | | G. | Mol | Time, h. | Temp., °C. | G. | Mol percent | | |
| 1 | 59 | 0.5 | 1 | | 30 | 0.52 | 15 | 50 | 56 | 83.5 | 146–148 | 11.0 |
| 2 | 59 | 0.5 | 0.6 | | 50 | 0.86 | 15 | 50 | 48.5 | 72.5 | 159–160 | 11.6 |
| 3 | 59 | 0.5 | 0.3 | | 50 | 0.86 | 37 | 50 | 25 | 37 | 148–150 | 10.8 |
| 4 | 59 | 0.5 | 1 | | 40 | 0.69 | 37 | 40 | 51 | 76 | 151–153 | 11.3 |
| 5 | 59 | 0.5 | 1 | | 40 | 0.69 | 96 | 30 | 51.5 | 77 | 148–150 | 11.5 |
| 6 | 59 | 0.5 | 0.6 | | 50 | 0.86 | 7 | 70 | 29 | 43 | 147–149 | 11.0 |
| 7 | 59 | 0.5 | | 1.5 | 40 | 0.69 | 15 | 70 | 56 | 83.5 | 155–156 | 11.6 |
| 8 | 59 | 0.5 | | 1.5 | 50 | 0.86 | 5.5 | 80 | 51 | 76 | 155–159 | 11.9 |
| 9 | 59 | 0.5 | | 1.5 | 40 | 0.69 | 4 | 80 | 49 | 73 | 156–158 | 11.6 |
| 10 | 59 | 0.5 | | 1 | 40 | 0.69 | 4 | 80 | 39.5 | 59 | 156–157 | 11.6 |
| 11 | 59 | 0.5 | | 1.5 | 50 | 0.86 | 37 | 50 | 37 | 55 | 156–158 | 11.6 |

The 3,4-epoxy-sulfolan produced by Example 1 was recrystallized from ethylacetate and analyzed $C_4H_6O_3S$ (134.1). Calc.: C, 35.83; H, 4.51; O, 35.80. Found: C, 35.97; H, 4.60; O, 35.55.

We claim:

1. Process for the production of 3,4-epoxysulfolane by heating a reaction mixture consisting essentially of 3-sulfolene, hydrogen peroxide in aqueous solution and a catalyst selected from the group consisting of tungstic acid and alkali metal salts of tungstic acid, the molecular ratio of hydrogen peroxide to 3-sulfolene in the reaction mixture being within the range from 1:1 to 2:1, the catalyst being present in an amount from 0.1 to 5% by weight based on the weight of the 3-sulfolene, to a temperature within the range from 30 to 90° C. during a time of 4 to 96 hours.

2. Process as defined in claim 1 in which the catalyst is tungstic acid and the reaction temperature is maintained within the range of 30 to 70° C.

3. Process as defined in claim 1 in which the catalyst is sodium tunstate and the reaction temperature is maintained within the range from 50 to 90° C.

4. Process as defined in claim 1 in which the concentration of the hydrogen peroxide used in the reaction mixture is from 30 to 60%.

References Cited

UNITED STATES PATENTS 2,833,787  5/1958  Carlson et al. _____ 260—348.5
3,248,404  4/1966  Werdelmann et al. __ 260—248.5
3,278,562  10/1966  Thigpen et al. _____ 260—348.5

OTHER REFERENCES

Prochazka et al.: Coll. Czech. Chem. Commun., 24: 1509–1514 (May 1959).

HENRY R. JILES, *Primary Examiner.*

C. M. SHURKO, *Assistant Examiner.*

U.S. Cl. X.R.

260—79.3, 45.8